United States Patent
Mammone et al.

[11] Patent Number: 5,522,012
[45] Date of Patent: May 28, 1996

[54] SPEAKER IDENTIFICATION AND VERIFICATION SYSTEM

[75] Inventors: Richard J. Mammone, Bridgewater; Khaled T. Assaleh, Highland Park, both of N.J.

[73] Assignee: Rutgers University, Piscataway, N.J.

[21] Appl. No.: 203,988

[22] Filed: Feb. 28, 1994

[51] Int. Cl.$^6$ .................... G10L 5/06; G10L 9/00
[52] U.S. Cl. .................... 395/2.59; 395/2.55; 395/2.4; 381/42
[58] Field of Search ............ 381/41–43, 29; 395/2, 2.4, 2.5, 2.55, 2.6, 2.63, 2.17, 2.81

[56] References Cited

U.S. PATENT DOCUMENTS

| | | | |
|---|---|---|---|
| 4,058,676 | 11/1977 | Wilkes et al. | 381/29 |
| 4,653,097 | 3/1987 | Watanabe et al. | 381/42 |
| 4,752,958 | 6/1988 | Cavazza et al. | 381/42 |
| 4,773,093 | 9/1988 | Higgins et al. . | |
| 4,837,830 | 6/1989 | Wrench, Jr. et al. | 381/42 |
| 4,888,823 | 12/1989 | Nitta et al. | 381/43 |
| 4,922,539 | 5/1990 | Rajasekaran et al. . | |
| 4,926,488 | 5/1990 | Nadas et al. . | |
| 4,945,567 | 7/1990 | Ozawa . | |
| 4,975,956 | 12/1990 | Liu et al. . | |
| 4,991,216 | 2/1991 | Fujii et al. . | |
| 5,001,761 | 3/1991 | Hattori . | |
| 5,007,094 | 4/1991 | Hsueh et al. . | |
| 5,048,088 | 9/1991 | Taguchi . | |
| 5,056,150 | 10/1991 | Yu et al. . | |
| 5,131,043 | 7/1992 | Fujii et al. | 395/2.63 |
| 5,146,539 | 9/1992 | Doddington et al. | 395/2 |
| 5,165,008 | 11/1992 | Hermansky et al. . | |
| 5,166,981 | 11/1992 | Iwashi et al. . | |
| 5,167,004 | 11/1992 | Netsch et al. . | |
| 5,293,448 | 3/1994 | Honda | 395/2.17 |
| 5,327,521 | 7/1994 | Savic et al. | 395/2.81 |

*Primary Examiner*—David K. Moore
*Assistant Examiner*—Tariqrafiq Hafiz
*Attorney, Agent, or Firm*—Mathews, Woodbridge & Collins

[57] ABSTRACT

The present invention relates to a speaker recognition method and system which applies adaptive component weighting to each frame of speech for attenuating non-vocal tract components and normalizing speech components. A linear predictive all pole model is used to select frames for an adaptively weighted cepstrum. Frames with a predetermined number of resonances are selected for cepstrum analysis. An adaptively weighted cepstrum is determined from a new transfer function. A normalized cepstrum is determined having improved characteristics for speech components. From the improved speech components, improved speaker recognition over a channel is obtained.

11 Claims, 7 Drawing Sheets

SPEAKER IDENTIFICATION AND VERIFICATION SYSTEM

This invention was made with Government support under the following grants: NO. F30602-91-C-0120 awarded by the Department of the Air Force; Grant No. MDA 904-92-C-5162 awarded by the National Security Agency and Grant No. 92F141800-000 awarded by the Central Intelligence Agency. The Government has certain rights in this invention.

BACKGROUND OF THE INVENTION

1. Field of the Invention

The present invention relates to a speaker recognition system or similar apparatus which applies adaptive weighting to spectral components in each frame of speech for normalizing the spectrum of speech, thereby reducing irrelevant variations such as communication channel effects. It also introduces a frame selection scheme by which only speaker dependent frames with relatively high segmental signal to noise ratio are selected.

2. Description of the Related Art

The objective of a speaker identification system is to determine which speaker is present from an utterance. Alternatively, the objective of a speaker verification system is to verify the speaker's claimed identity from an utterance. Speaker identification and speaker verification systems can be defined in the general category of speaker recognition.

It is known that typical telephone switching systems often route calls between the same starting and ending locations on different channels. A spectrum of speech determined on each of the channels can have a different shape due to the effects of the channel. Recognition of voices on different channels is therefore difficult because of the variances in the spectrum of speech due to non-formant spectral components.

Conventional methods have attempted to normalize the spectrum of speech to correct for the spectral shape. U.S. Pat. No. 5,001,761 describes a device for normalizing speech around a certain frequency which has a noise effect. A spectrum of speech is divided at the predetermined frequency. A linear approximate line for each of the divided spectrum is determined and approximate lines are joined at the predetermined frequency for normalizing the spectrum. This device has the drawback that each frame of speech is only normalized for the predetermined frequency having the noise effect and the frame of speech is not normalized for reducing non-formant components effects which can occur over a range of frequencies in the spectrum.

U.S. Pat. No. 4,926,488 describes a method for normalizing speech to enhance spoken input in order to account for noise which accompanies the speech signal. This method generates feature vectors of the speech. A feature vector is normalized by an operator function which includes a number of parameters. A closest prototype vector is determined for the normalized vector and the operator function is altered to move the normalized vector closer to the closest prototype. The altered operator vector is applied to the next feature vector in the transforming thereof to a normalized vector. This patent has the limitation that it does not account for non-formant components effects which might occur over more than one frequency.

Speech has conventionally been modeled in a manner that mimics the human vocal tract. Linear predictive coding (LPC) has be used for describing short segments of speech using parameters which can be transformed into a spectrum of positions (frequencies) and shapes (bandwidths) of peaks in the spectral envelope of the speech segments. LPC cepstral coefficients represent the inverse z transform of the logarithm of the LPC spectrum of a signal. Cepstral coefficients can be derived from the frequency spectrum or from linear predictive LP coefficients. Cepstral coefficients can be used as dominant features for speaker recognition.

It has been found that a reduced set of cepstral coefficients can be used for synthesizing or recognizing speech. U.S. Pat. No. 5,165,008 describes a method for synthesizing speech in which five cepstral coefficients are used for each segment of speaker independent data. The set of five cepstral coefficients is determined by linear predictive analysis in order to determine a coefficient weighting factor. The coefficient weighting factor minimizes a non-squared prediction error of each element of a vector in the vocal tract resource space. The same coefficient weighting factors are applied to each frame of speech and do not account for the spectral variations resulting from the effects of non-formant components.

It is desirable to provide a set of spectral features that emphasize the vocal-tract (formant) information while reducing the non-vocal tract effects by applying an adaptive weighting scheme to the components of the short-time spectrum of the speech signal. For this adaptive weighting scheme, it is preferable to provide a frame selection criterion that only chooses frames that exhibit specific spectral characteristics. Such frames correspond to voiced sounds which have most of the speaker characteristic information.

SUMMARY OF THE INVENTION

The method of the present invention utilizes the fact that there is a difference between spectral components that correspond to formant information and other spectral components that do not. This difference is indicated in the bandwidths of these components. It has been found that non-formant components have bandwidths which are substantially larger than the bandwidths for formant components. Broad-bandwidth components carry unreliable information that is irrelevant to the speaker identity. Thus, the present invention attenuates the broad-bandwidth components of the spectrum which results in an improved separability of the features in the feature space. The features of the present invention can be used in products such as a high performance speaker recognition apparatus.

The method involves the analysis of an analog speech signal by converting the analog speech signal to digital form and then successive overlapping frames of digital speech. The frames of digital speech are respectfully analyzed utilizing linear predictive analysis to extract parameters known as prediction coefficients. The prediction coefficients represent the coefficients of the linear prediction polynomial which has a plurality of roots that correspond to the poles of an all pole filter that models the vocal tract and characterizes the spectral components of the speech frames. Depending on the location of the poles within the unit circle, a frame is selected or rejected. Selected frames are used in the process of extracting features in order to represent the speech signal.

Components of the spectra of the selected frames can be adaptively weighted to enhance the contribution of the salient components based on their corresponding bandwidth. An adaptive set of weights are applied to the spectral components to enhance the formant structure by attenuating the broad-bandwidth components. Cepstral coefficients are determined based on the adaptively weighted spectrum to provide enhanced features of the speech signal. The enhanced features provide improved speaker recognition performance.

Preferably, the speaker recognition system of the present invention can be used for verifying the identity of a person over a telephone system for credit card transactions, telephone billing card transactions and gaining access to computer networks. In addition, the speaker recognition system can be used for voice activated locks for doors, voice activated car engines and voice activated computer systems.

The invention will be further understood by reference to the following drawings.

DETAILED DESCRIPTION OF THE INVENTION

During the course of the description, like numbers will be used to identify like elements according to the different figures which illustrate the invention.

Figure 1:
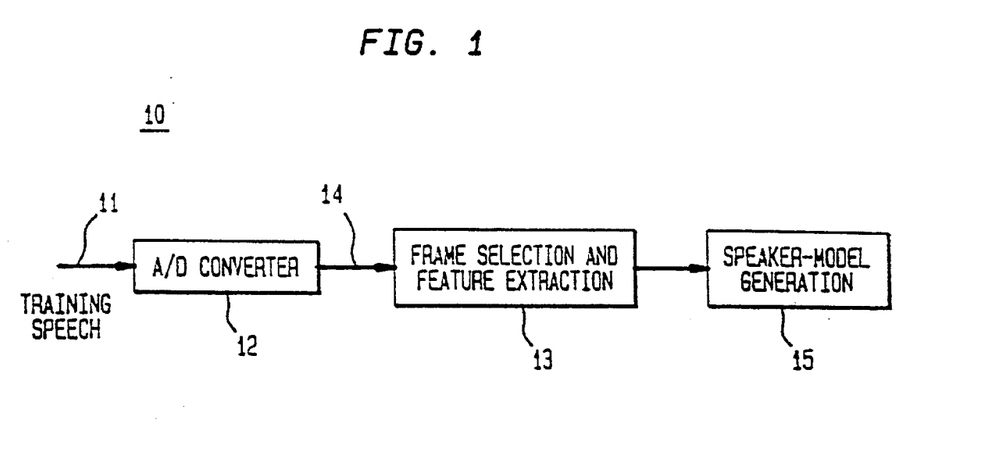
FIG. 1 is a flow diagram of the system of the present invention during training of the system.

FIG. 1 illustrates a flow diagram of speaker recognition system 10 during training of the system. A training input speech signal 11 is applied to an analog to digital (A/D) converter 12 to provide digitized speech signals. The digitized signal is partitioned into successive overlapping frames. Frame selection and feature extraction module 13 receives the digital speech 14. Frame selection and feature extraction module 13 obtains characteristic parameters of the selected digital speech frames. For speaker recognition, the features extracted in feature extraction module 13 are unique to the speaker to allow for adequate speaker recognition.

Speaker modeling is performed in block 15 by clustering the extracted features or training a neural network to learn these features. Clustering techniques, which can be used in the present invention, include vector quantization (VQ), Guassian mixture model (GMM), and Hidden Markov models (HMM). In the alternative, modeling can be performed by training different architectures of neural networks (NN) such as multilayer perception (MLP) NN, radial basis functions (RBF) NN, and Neural tree networks (NTN). The speaker models can be stored in a computer for later processing. It will be appreciated that other classification methods which are known in the art could be used with the teachings of the present invention.

Figure 2:
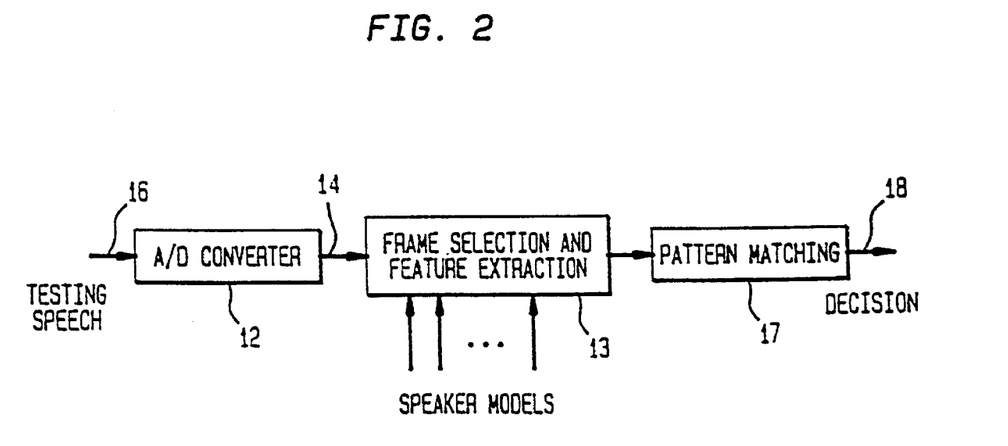
FIG. 2 is a block diagram of the speaker recognition system during speaker identification or verification.

In FIG. 2, speaker recognition system 10 is shown for speaker identification or verification during testing. A testing speech signal 16 digitized by an A/D converter 12 is applied to frame selection and feature extraction module 13. Extracted features of the speech input testing signal 16 are received at pattern matching module 17.

Pattern matching module 17 determines the closest match for speech input testing signal 16 among the speaker models generated by speaker modeling module 14 for training signals 11. Based on the result of pattern matching module 17, a decision 18 is made to determine the unknown speaker's identity in the case of speaker identification, or for verifying the speaker's claimed identity in the case of speaker verification systems.

Figure 3:
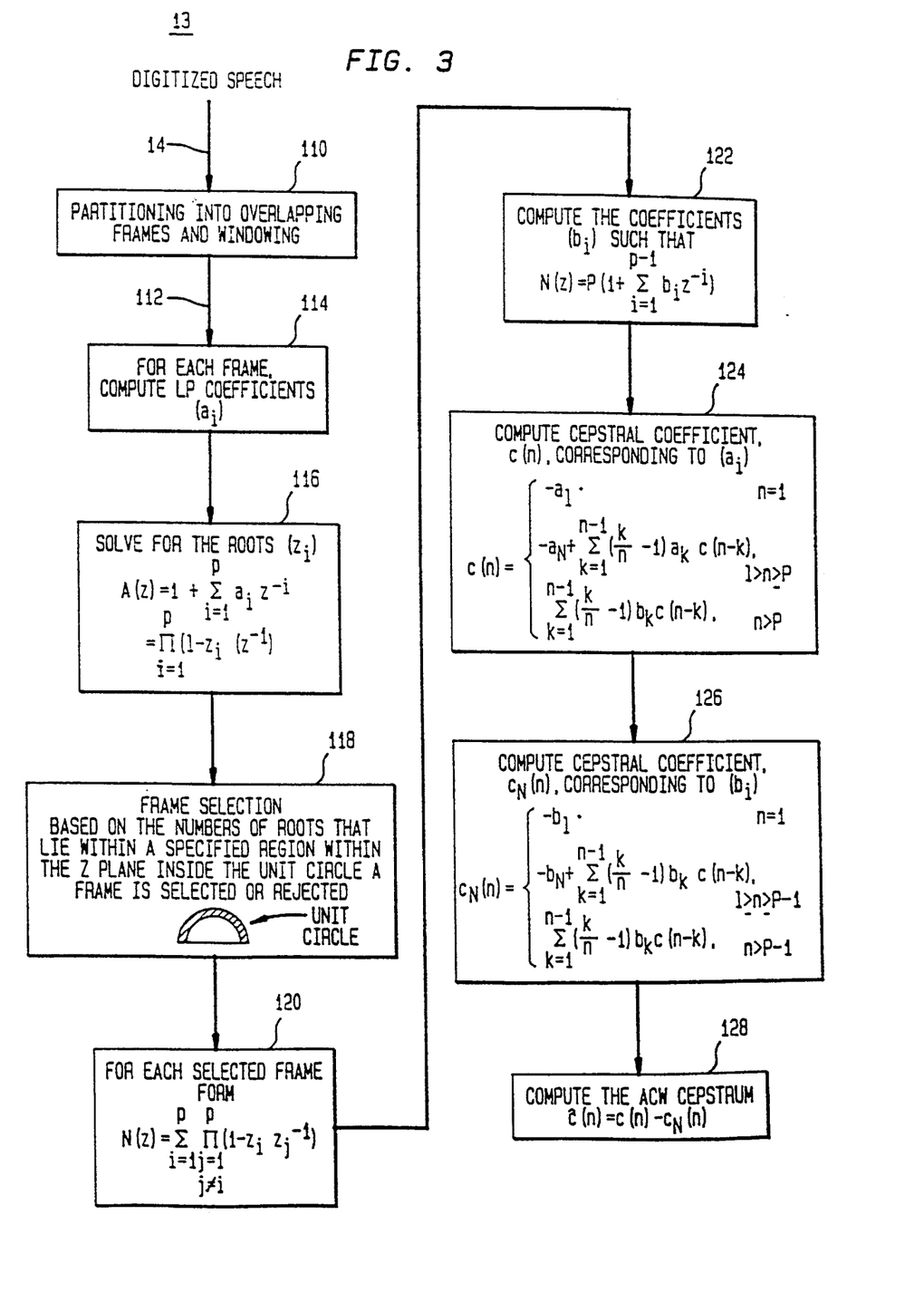
FIG. 3 is a flow diagram of the frame selection and feature extraction module.

FIG. 3 illustrates a flow diagram of a preferred embodiment for the implementation of frame selection and feature extraction block 13. Frame selection and feature extraction block 13 attenuates broad bandwidth components of the spectrum.

The present invention modifies the linear predictive (LP) spectrum to be robust against channel variations occurring from broad bandwidth components. Preferably, the modifications of the LP spectrum eliminate the residues $r_i$ from the LP spectrum for attenuating the contribution of the broad-bandwidth components. Digital speech signal 14 is partitioned into overlapping short segments in block 110. Preferably, the segments are windowed by a Hamming window. Windowed segments will be referred to as speech frames.

A speech frame 112 is applied to block 114 to obtain linear predictive (LP) coefficients. ALP polynomial A(z) for a speech signal can be defined by the following equation:

$$A(z) = 1 + \sum_{i=1}^{P} a_i z^{-i} \quad (1)$$

wherein $a_i$ are the LP coefficients and P is the order of the LP model. The LP coefficients can be computed by the autocorrelation method.

In linear predictive coding analysis, the transfer function of the vocal tract, H(z) is modeled on a short time basis by a $p^{th}$ all-pole filter given by $$H(z) = \frac{1}{A(z)} = \frac{1}{1 + \sum_{i=1}^{P} a_i z^{-i}} \quad (2)$$

The roots of A(z) can be determined in block 116 by factoring the LP polynomial A(z) to obtain:

$$A(z) = \prod_{i=1}^{P} (1 - z_i z^{-1}) \quad (3)$$

wherein $z_i$ are the roots of LP polynomial A(z) and P is the order of the LP polynomial. Since the prediction coefficients are real, the roots of the LP polynomial are either real or occur in complex conjugate pairs. The autocorrelation method guarantees the stability of H(z), therefore all the roots $z_i$ lie inside the unit circle of the complex z plane. The center frequencies, $\omega_i$ and bandwidths, $B_i$ of the spectral components are related to the roots $z_i$ by the following relation.

$$Z_i = e^{-B_i + j\omega_i} \quad (4)$$

The all-pole model can be expressed in a parallel form by partial fraction expansion:

$$H(z) = \frac{1}{1 + \sum_{i=1}^{P} a_i z^{-1}} = \sum_{i=1}^{P} \frac{r_i}{(1 - z_i z^{-1})} \quad (5)$$

where $r_i$ are the residues.

In the above-described all pole model representation of equation 5, the $i^{th}$ spectral component can be fully parameterized by $\omega_i$, $B_i$, and $r_i$.

Frame selection block 118 selects or rejects speech frames 112 for further processing based on the number roots that lie within a specified region within the z-plane inside a unit circle. The roots represent the center frequencies $\omega_i$ and bandwidths $B_i$ of the LP spectrum corresponding to the resonances of the voiced speech signal. It has been found that voiced speech includes most of the speaker dependent information and is least effected by distortions. Voiced speech frames include a predetermined number of resonances.

Frame selection block 112 selects frames having: 1) a predetermined number of roots within the unit circle of the z-plane which correspond to a predetermined number of resonances within a predetermined frequency range; and 2) a bandwidth less than a predetermined threshold. Frame selection block 112 rejects frames having less than the predetermined number of resonances falling within the predetermined ranges of frequency and band width.

Selected frames 119 are received at block 120. Blocks 120-128 illustrate one embodiment for modifying the LP spectrum in order to normalize residues. Block 120 determines a finite impulse response (FIR) filter represented by N(z) that emphasizes the dominant modes (formants) of the signal. Normalization can be achieved by setting residue $r_i$=constant, which can be viewed as weighting the $i^{th}$ component by $1/r_i$. Normalizing residues $r_i$ results in a modified spectrum which can be referred to as an adaptive component weighting spectrum (ACW) spectrum. The ACW spectrum is given by $$H(z) \sum_{i=1}^{P} \frac{1}{(1 - z_i z^{-1})} = \frac{N(z)}{1 + \sum_{i=1}^{P} a_i z^{-1}} \quad (6)$$

where $$N(z) = \sum_{k=1}^{P} \prod_{\substack{i=1 \\ i \neq k}}^{P} (1 - z_i z^{-1}) \quad (7)$$

which can be written in the form $$N(z) = P \left( 1 + \sum_{i=1}^{P-1} b_i z^{-1} \right) \quad (8)$$

Weighting the $i^{th}$ component of the LP spectrum by $1/r_i$ serves the goal of emphasizing the narrow-bandwidth components and attenuating the broad-bandwidth components. This is due to the fact that the peak value of the magnitude of the $i^{th}$ component is given by $$\frac{1}{(1 - z_i z^{-1})} \bigg|_{z = e^{j\omega_i}} = \frac{1}{1 \cdot |z_i|} \approx \frac{1}{B_i} \quad (9)$$

Thus, narrow-bandwidth components are amplified and broad-bandwidth components are attenuated.

From equation 8 it is shown that Ĥ(z) is not an all pole transfer function. Ĥ(z) has (p-1) zeros corresponding to the roots of N (z). Block 122 determines adaptive component weighting coefficients $b_i$ from equation (8) by the autocorrelation method. Block 124 determines cepstral coefficient c(n) corresponding to LP coefficients $a_i$. LP cepstral coefficient c(n) is defined as the inverse z transform of the natural logarithm of the LP cepstrum, H(z) represented by $$\ln H(z) = -\ln A(z) = -\ln \left( 1 + \sum_{i=1}^{P} a_i z^{-1} \right) = \sum_{n=1}^{\infty} c(n) z^{-n} \quad (10)$$

A recursive relationship between c(n) and the prediction coefficients a(n) can be obtained by differentiating both sides of the equation (11) with respect to $z^{-1}$ and equating the coefficients of equal power of $z^{-1}$. This relation is given by $$c(1) = -a(1), \; n=1 \quad (11)$$

Block 126 determines adaptive component weighting $$c(n) = -a(n) + \sum_{k=1}^{n-1} \left( \frac{k}{n} - 1 \right) a_k c(n-k), \; 1 < n \leq P,$$

$$c(n) = \sum_{k=1}^{n-1} \left( \frac{k}{n} - 1 \right) a(k) c(n-k), \; n > P.$$

cepstral coefficient $c_N(n)$ corresponding to adaptive component weighting coefficients $b_i$. $c_N(n)$ can be computed from the recursive relationship with the coefficients, $b_k$, of N(z) given in equation (7). This relationship is given by $$C_N(1) = -b_1, \quad (12)$$

$$c_N(n) = -b_n + \sum_{k=1}^{n-1} \left( \frac{k}{n} - 1 \right) b_k c_N(n-k), \; 1 < n \leq P - 1$$

$$c_N(n) = \sum_{k=1}^{n-1} \left( \frac{k}{n} - 1 \right) b_k c_N(n-k), \; n > P - 1$$

Block 128 computes the ACW cepstrum. The ACW cepstrum, ĉ(n) can be defined as the inverse z transform of the natural logarithm of the ACW cepstrum, Ĥ(z).

$$\ln \hat{H}(z) = -\ln(A(z)) - (-\ln(N)(z))) = \sum_{n=1}^{\infty} c(n) z^{-n} \quad (13)$$

$$= \sum_{n=1}^{\infty} c(n) z^{-n} - \sum_{n=1}^{\infty} c_N(n) z^{-n} \quad (14)$$

$$= \sum_{n=1}^{\infty} (c(n) - c_N(n)) z^{-n} \quad (15)$$

Thus, the ACW cepstrum ĉ(n) is given by $$\hat{c}(n) = c(n) - c_N(n). \quad (16)$$

Equation 16 shows that the effect of N(z) in the cepstral domain results in a subtractive component, $c_N(n)$, from the LP cepstrum.

Figure 4:
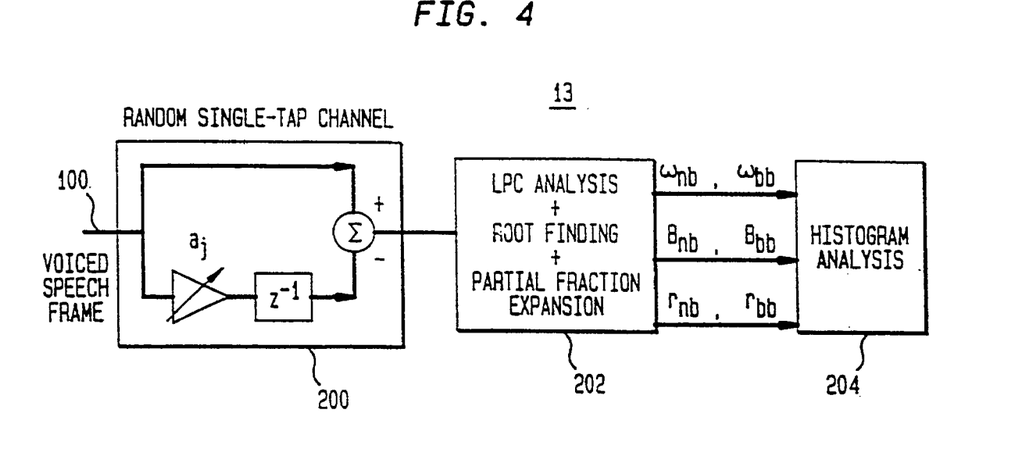
FIG. 4 is a block diagram of an experiment of the sensitivity of LP spectral component parameters having narrow and broad bandwidths with respect to a random single tap channel.

The sensitivity of the parameters ($\omega_i$, $B_i$, $r_i$) with respect to channel variations have been experimentally evaluated with the following experiment illustrated in FIG. 4.

A voiced frame of speech 199 is processed through a random single-tap channel 200 given by $$\Theta_j(z) = 1 - a_j z^{-1}$$

where $a_j$ is a sequence of uniformly distributed J random numbers between 0.0 and 1.0. The sequences of the parameters ($\omega_i$, $B_i$, $r_i$) are computed in block 202 for each $a_j$, j=1, 2..., J. Two sequences of parameters ($\omega_i$, $B_i$, $r_i$) representing a narrow-bandwidth (nb) component and a broad-bandwidth (bb) component are selected. These components are denoted by ($\omega_{nb}$, $B_{nb}$, $r_{nb}$) and ($\omega_{bb}$, $B_{bb}$, $r_{bb}$) respectively. The sensitivity of the parameters of the selected narrow-bandwidth and broad-bandwidth components is evaluated by histogram analysis block 204.

Figure 5A:
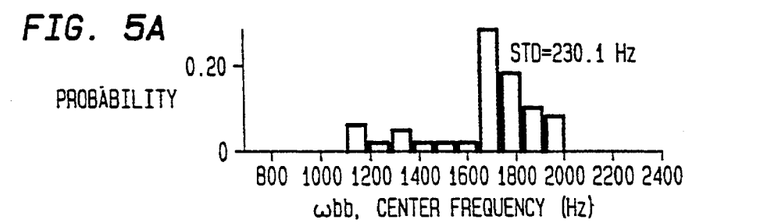
FIG. 5A is a histogram analysis for a broad bandwidth component $\omega_{bb}$.
Figure 5B:
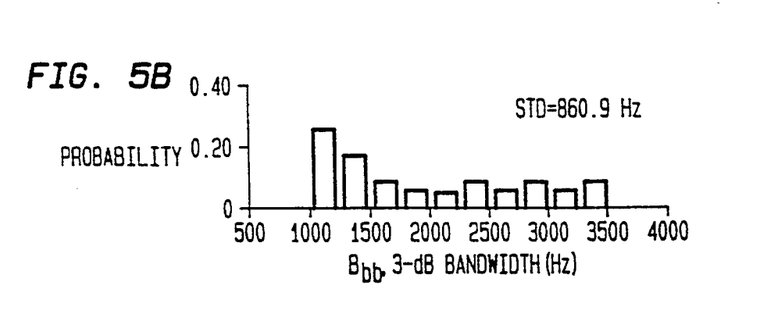
FIG. 5B is a histogram analysis for a broad bandwidth component $B_{bb}$.
Figure 5C:
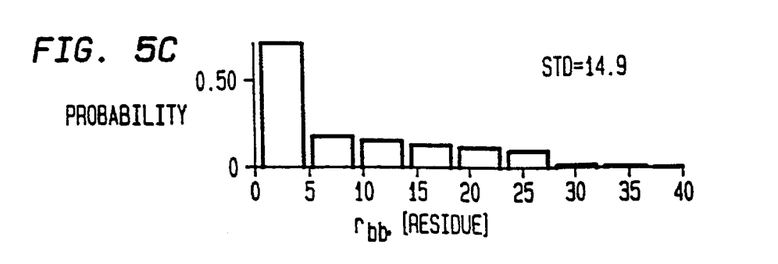
FIG. 5C is a histogram analysis for a broad bandwidth component $r_{bb}$.

For the broad-bandwidth component, the histograms of the parameters $\omega_{bb}$, $B_{bb}$ and $r_{bb}$ are shown in FIGS. 5A, 5B and 5C respectively. The broad-bandwidth histograms indicate that center frequencies $\omega_{bb}$, bandwidths $B_{bb}$, and residues $r_{bb}$ associated with broad-bandwidth components have large variances with respect to channel variations. The broad-bandwidth components introduce undesired variability to the LP spectrum which creates mismatches between features of similar speech signals processed through different channels.

Figure 6A:
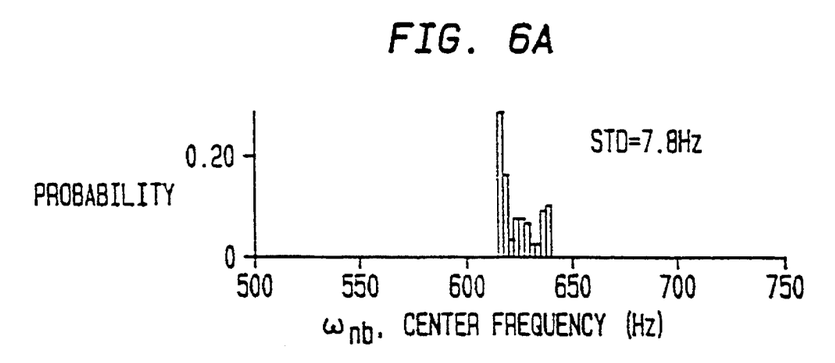
FIG. 6A is a histogram analysis for narrow bandwidth component $\omega_{nb}$.
Figure 6B:
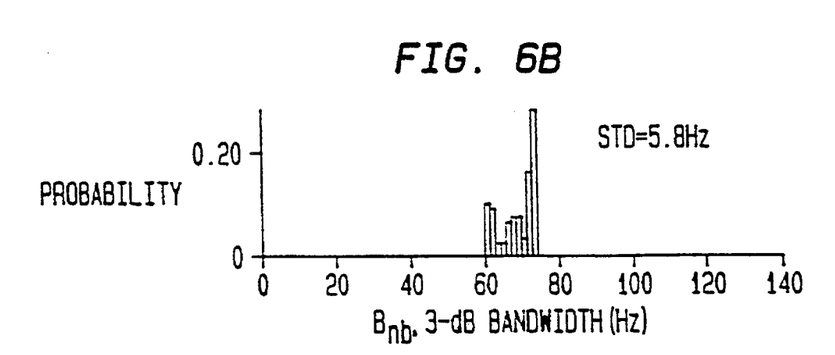
FIG. 6B is a histogram analysis for narrow bandwidth component $B_{nb}$.
Figure 6C:
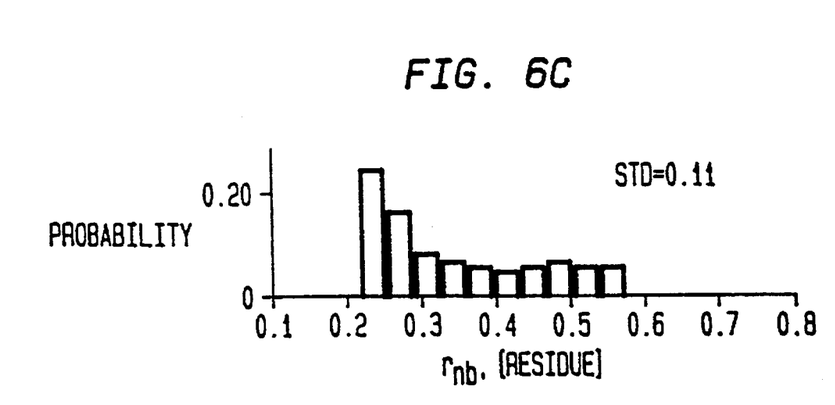
FIG. 6C is a histogram analysis for narrow bandwidth component $r_{nb}$.

For the narrow-bandwidth component, the histograms of the parameters $\omega_{nb}$, $B_{nb}$, and $r_{nb}$ are shown in FIGS. 6A, 6B and 6C respectively. The narrow bandwidth histograms indicate that center frequencies $\omega_{nb}$ and bandwidths $B_{nb}$ associated with narrow-bandwidth components are relatively invariant with channel variations since the histograms show very small variances. The residues associated with narrow bandwidth components demonstrate large variances.

Figure 7A:
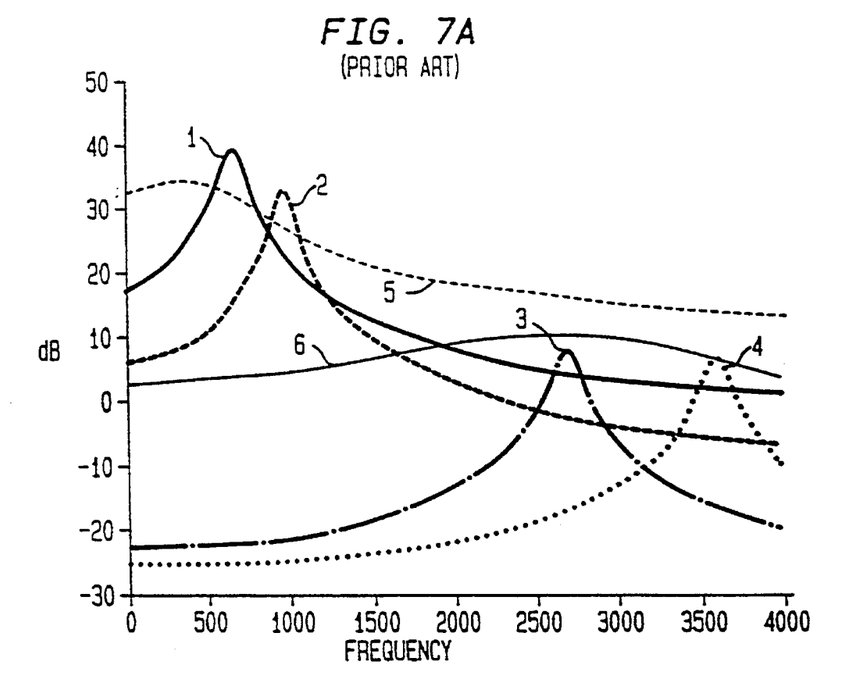
FIG. 7A is a graph of the component of a prior art LP spectrum.
Figure 7B:
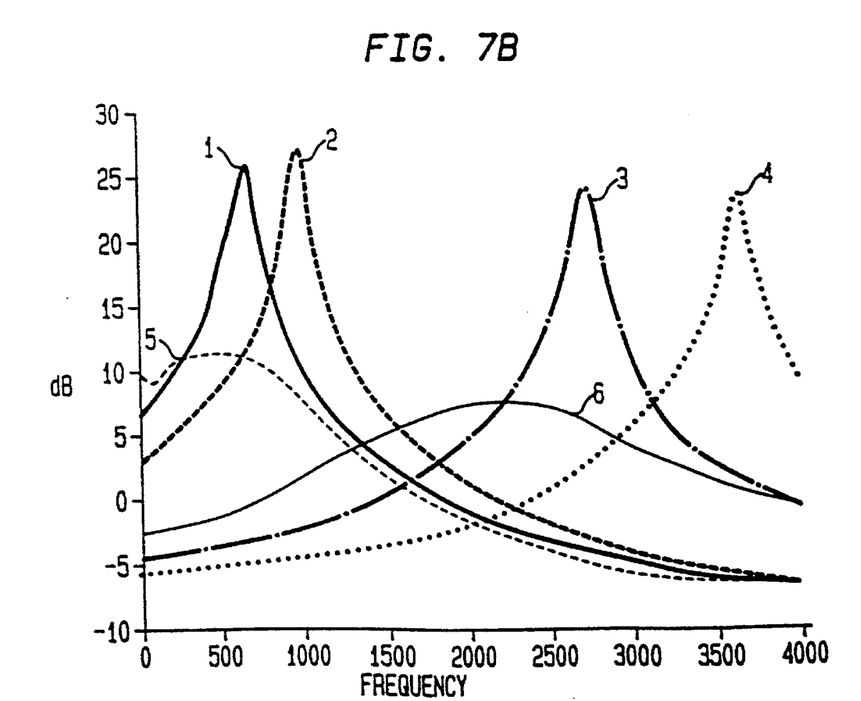
FIG. 7B is a graph of the components of the ACW spectrum.

FIGS. 7A and 7B illustrates the result of adaptive component weighting. FIG. 7A shows the components of the LP spectrum H(z) for a voiced speech frame. FIG. 7B shows the components of the ACW spectrum $\hat{H}(z)$ for the same frame. Peaks 1–4 represent voiced speech resonances having narrow bandwidths and peaks 5 and 6 represent broad bandwidth components. In FIG. 7B, peaks 1–4 have improved values and peaks 5 and 6 have attenuated values.

Figure 8A:
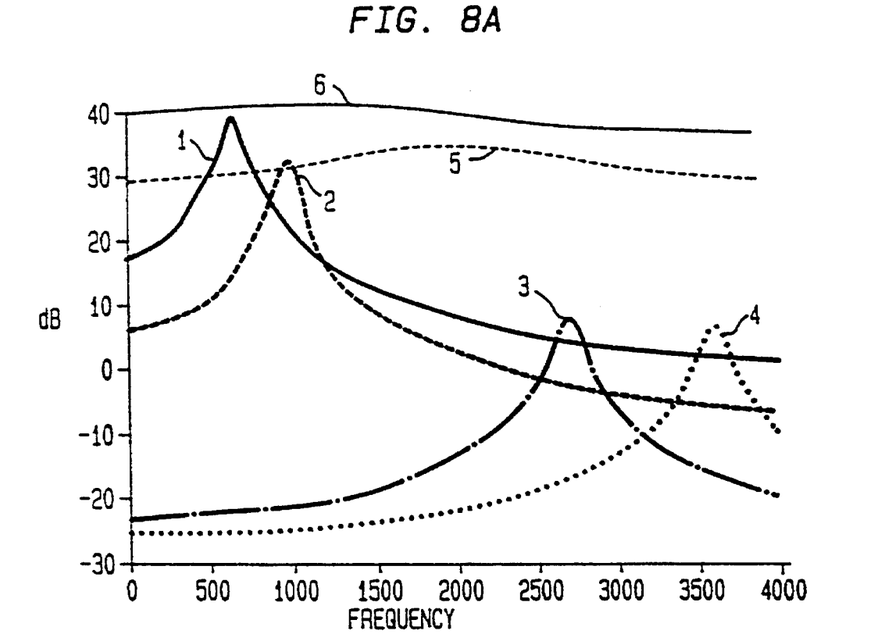
FIG. 8A is a graph of the components of a prior art LP spectrum after processing through a single-tap channel having $(1-0.9\ z^{-1})$.

FIG. 8A is a graph of the prior art LP spectrum shown in FIG. 7A after processing through a single tap channel defined by (1-0.9 $z^{-1}$). A spectral mismatch is created by the single tap channel. The spectral mismatch can be seen by comparing FIG. 8A with FIG. 7A. FIG. 8A indicates a spectral shift for peaks 5 and 6 and peaks 3 and 4.

Figure 8B:
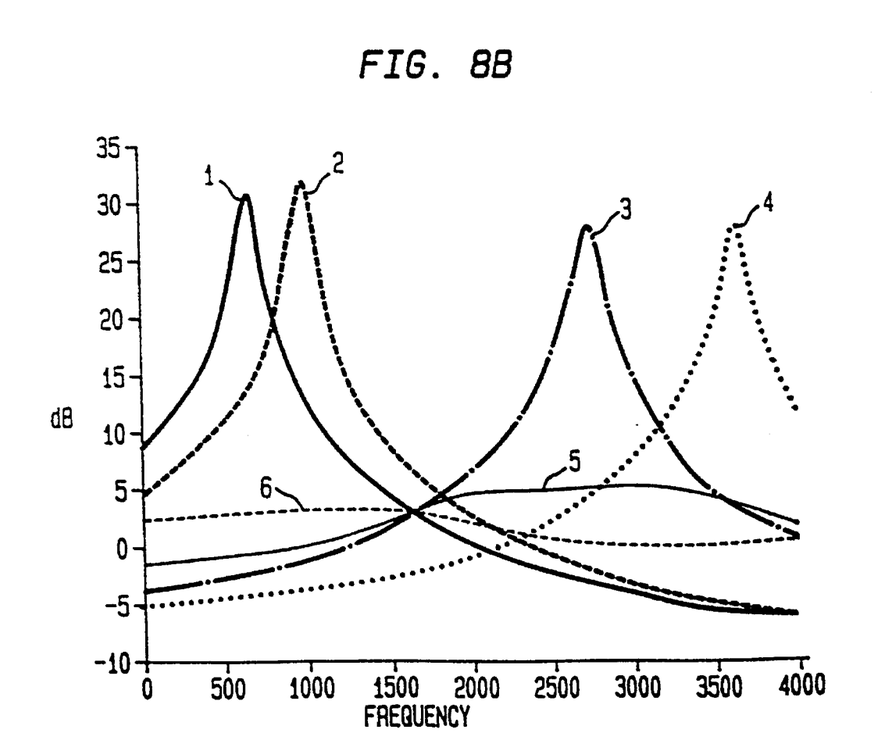
FIG. 8B is a graph of the components of the ACW spectrum after processing through a single-tap channel having $(1-0.9\ z^{-1})$.

FIG. 8B is a graph of the ACW spectrum shown in FIG. 8A after processing through a single tap channel defined by (1-0.9 $z^{-1}$). FIG. 8B indicates reduction of spectral mismatch by adaptive component weighting. The effect can be seen by comparing the ACW spectra before and after processing through the single tap channel which are shown in FIG. 7B and FIG. 8B respectively. FIG. 8B indicates improved values for peaks 1–4 and attenuated values for peaks 5 and 6. There is no spectral shift for peaks 1–6. It is shown that spectral mismatch can be greatly reduced with the adaptive component weighting spectrum.

Figure 9:
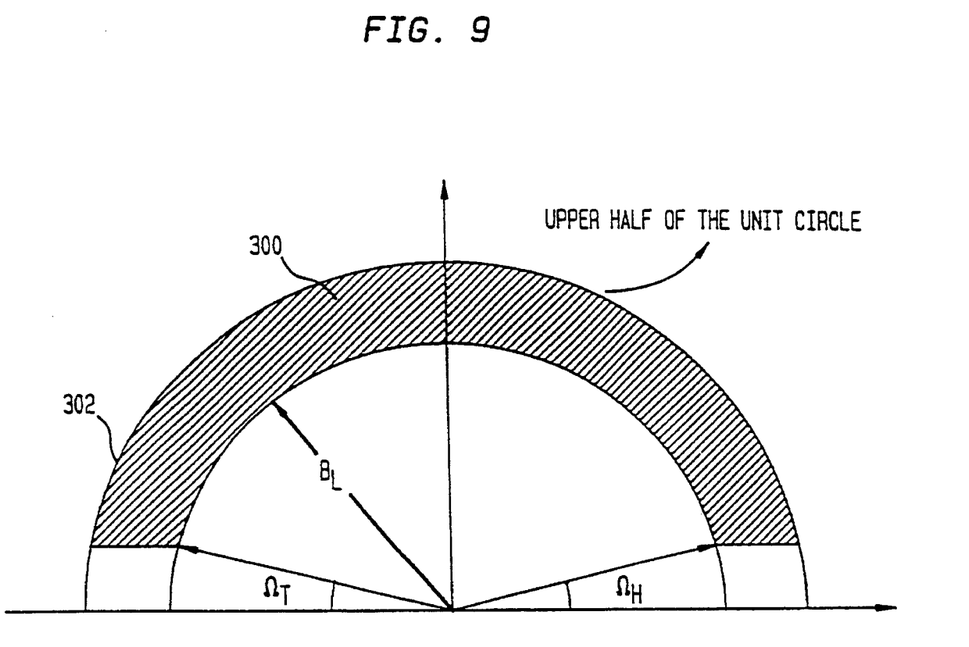
FIG. 9 is a schematic diagram of the frame selection module shown in FIG. 3.

Frame selection block 118 is shown in greater detail in FIG. 9. Frames 112 that have a predetermined number of poles that lie within region 300 are selected by frame selection block 118. Region 300 is bounded by frequencies $\Omega_L$-$\Omega_H$. Frequencies, $\Omega_L$ and $\Omega_H$ are chosen to define the range of a format. Region 300 is also bounded by the unit circle 302 and bandwidth threshold $B_L$. Presumably, $B_L$ is at least 400 Hz. Frames that have a predetermined number of resonances in frequency range $\Omega_L$-$\Omega_H$ and bandwidths less than bandwidth threshold $B_L$ are selected.

The present invention has the advantage of providing an adaptively weighted cepstrum which attenuates large bandwidth components for improved recognition of narrow bandwidth components relating to voiced speech. The present invention is preferably used for speaker recognition over a telephone system.

While the invention has been described with reference to the preferred embodiment, this description is not intended to be limiting. It will be appreciated by those of ordinary skill in the art that modifications may be made without departing from the spirit and scope of the invention.

We claim:

1. A method for speaker recognition comprising the steps of:

windowing a speech segment into a plurality of speech frames;

determining linear prediction coefficients from a linear predictive polynomial for each said frame of speech;

determining a first cepstral coefficient from said linear prediction coefficients in which first cepstrum information comprises said first cepstral coefficient;

applying an all pole filter to said linear prediction polynomial;

determining a plurality of roots of said linear prediction polynomial from the poles of said all pole filter, each said root including a residue component;

selecting one of said frames having a predetermined number of said roots within a unit circle of the z-plane in which said selected frames form said predetermined components of said first cepstrum information;

applying weightings to predetermined components from said first cepstrum information for producing an adaptive component weighting cepstrum to attenuate broad bandwidth components in said speech signal, by determining a finite impulse response filter for emphasizing the speech formants of said speech signal and attenuating said residue components comprising the steps of determining a finite impulse response filter for emphasizing the speech formants of said speech signal and attentuating said residue components, determining adaptive component weighting coefficients from said finite impulse response filter, determining a second cepstral coefficient from said adaptive component weighting coefficients, and subtracting said second cepstral coefficient from said first cepstral coefficient for forming said adaptive component weighting cepstrum; and recognizing said adaptive component weighting cepstrum by calculating similarity of said adaptive component weighting cepstrum and a plurality of speech patterns which were produced by a plurality of speaking persons in advance.

2. A system for speaker recognition comprising:

means for converting a speech signal into a plurality of frames of digital speech;

speech parameter extracting means for converting said digital speech into first cepstrum information, said speech parameter extracting means comprising an all pole linear predictive (LPC) filter means, for determining a plurality of roots of said LPC filter, each said root including a residue component, and means for selecting ones of said frames having a predetermined number of said roots within a unit circle of the z-plane wherein said selected frames form said predetermined components of said first cepstrum information;

speech parameter enhancing means for applying adaptive weightings to said first cepstrum information for producing an adaptive component weighting cepstrum to attenuate broad bandwidth components in said speech signal, said speech parameter enhancing means comprising, a finite impulse response filter for emphasizing the speech formants of said speech signal and attenuating said residue components, means for computing adaptive component weighting coefficients from said finite impulse response filter, means for computing a second cepstral coefficient from said adaptive component weighting coefficients, and means for subtracting said second cepstral coefficient from said first cepstral coefficient for forming said adaptive component weighting cepstrum; and evaluation means for determining a similarity of said adaptive component weighting cepstrum with a plurality of speech samples which were produced by a plurality of speaking persons in advance.

3. A method for speaker recognition comprising the steps of:

windowing a speech segment into a plurality of speech frames;

determining linear prediction coefficients from a linear predictive polynomial for each said frame of speech;

determining a first cepstral coefficient from said linear prediction coefficients in which first cepstrum information comprises said first cepstral coefficient;

applying an all pole filter to said linear prediction polynomial;

determining a plurality of roots of said linear prediction polynomial from the poles of said all pole filter, each said root including a residue component;

selecting one of said frames having a predetermined number of said roots within a unit circle of the z-plane in which said selected frames form said predetermined components of said first cepstrum information;

applying weightings to predetermined components from said first cepstrum information for producing an adaptive component weighting cepstrum to attenuate broad bandwidth components in said speech signal, by determining a finite impulse response filter for emphasizing the speech formants of said speech signal and attenuating said residue components and determining adaptive component weighting coefficients from said finite impulse response filter; and recognizing said adaptive component weighting cepstrum by calculating similarity of said adaptive component weighting cepstrum and a plurality of speech patterns which were produced by a plurality of speaking persons in advance.

4. The method of claim 3 wherein said finite impulse response filter normalizes said residue components of said first spectrum.

5. The method of claim 4 wherein said finite impulse response filter corresponds to an adaptive component weighting spectrum of the form $$N(z) = P\left(1 + \sum_{i=1}^{P-1} b_i z^{-1}\right)$$

wherein $b_i$ are said adaptive component weighting coefficients and P is the order of the LP analysis.

6. The method of claim 5 further comprising the step of:

classifying said adaptive component weighting cepstrum in a classification means as said plurality of speech patterns.

7. The method of said claim 6 further comprising the step of:

determining said similarity of said adaptive component weighting cepstrum with said speech patterns by matching said adaptive component weighting cepstrum with said classified adaptive component weighting cepstrum in said classification means.

8. A system for speaker recognition comprising:

means for converting a speech signal into a plurality of frames of digital speech;

speech parameter extracting means for converting said digital speech into first cepstrum information, said speech parameter extracting means comprising an all pole linear predictive (LPC) filter means, for determining a plurality of roots of said LPC filter, each said root including a residue component, and means for selecting ones of said frames having a predetermined number of said roots within a unit circle of the z-plane wherein said selected frames form said predetermined components of said first cepstrum information;

speech parameter enhancing means for applying adaptive weightings to said first cepstrum information for producing an adaptive component weighting cepstrum to attenuate broad bandwidth components in said speech signal, said speech parameter enhancing means comprising, a finite impulse response filter for emphasizing the speech formants of said speech signal and attenuating said residue components, means for computing adaptive component weighting coefficients from said finite impulse response filter; and evaluation means for determining a similarity of said adaptive component weighting cepstrum with a plurality of speech samples which were produced by a plurality of speaking persons in advance.

9. The system of said components of claim 8 wherein said finite impulse response filter corresponds to an adaptive component weighting spectrum of the form $$N(z) = P\left(1 + \sum_{i=1}^{P-1} b_i z^{-1}\right)$$

wherein $b_i$ are said adaptive component weighting coefficients and P is the order of analysis.

10. The system of claim 9 further comprising:

means for classifying said adaptive component weighting cepstrum as said plurality of speech patterns.

11. The system of said claim 10 further comprising:

means for determining said similarity of said adaptive component weighting cepstrum with said speech patterns by matching said adaptive component weighting cepstrum with said stored adaptive component weighting cepstrum in said classification means.

* * * * *